H. T. HALLOWELL.
METAL BENCH STRUCTURE.
APPLICATION FILED APR. 29, 1916.
1,313,182.
Patented Aug. 12, 1919.
2 SHEETS—SHEET 1.
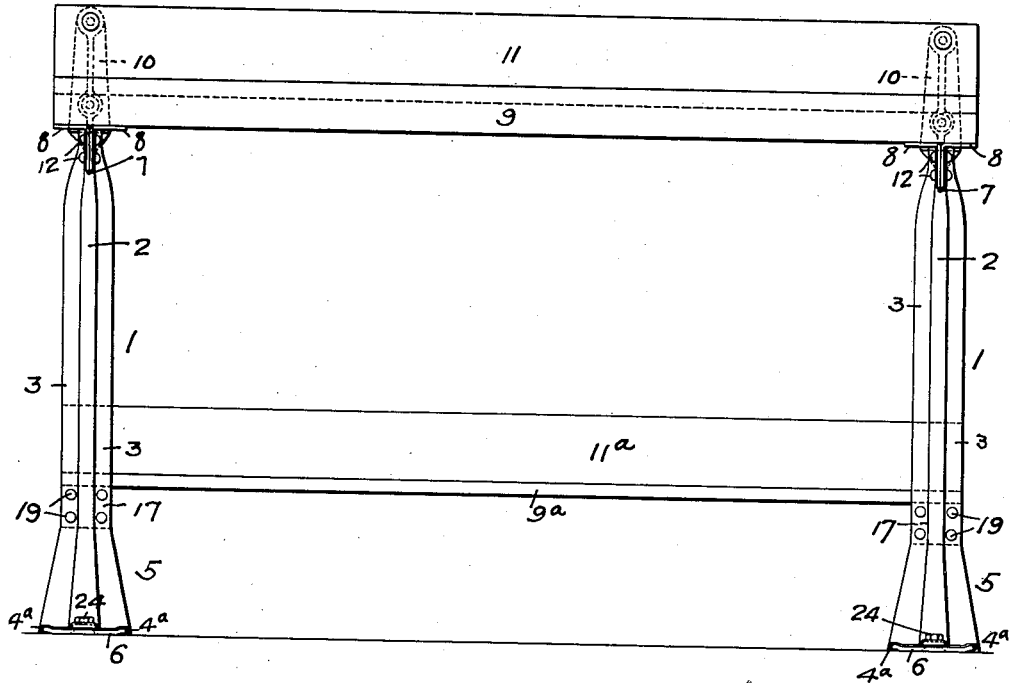
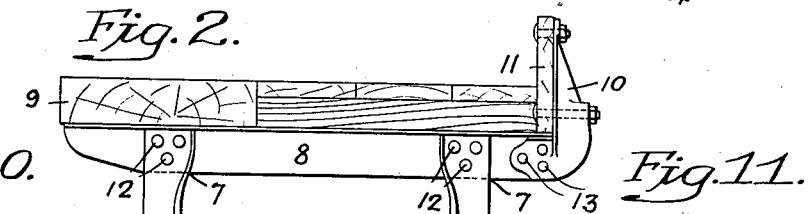
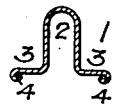
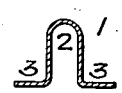
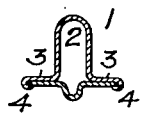
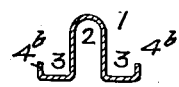
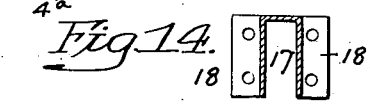
Inventor-
Howard T. Hallowell
by his Attorneys
Howson & Howson

H. T. HALLOWELL.
METAL BENCH STRUCTURE.
APPLICATION FILED APR. 29, 1916.

1,313,182.

Patented Aug. 12, 1919.
2 SHEETS—SHEET 2.

Inventor
Howard T. Hallowell
by his Attorneys
Howson & Howson

UNITED STATES PATENT OFFICE.

HOWARD T. HALLOWELL, OF PHILADELPHIA, PENNSYLVANIA.

METAL-BENCH STRUCTURE.

1,313,182.  Specification of Letters Patent.  Patented Aug. 12, 1919.

Application filed April 29, 1916.  Serial No. 94,452.

*To all whom it may concern:*

Be it known that I, HOWARD T. HALLOWELL, a citizen of the United States, residing in Philadelphia, Pennsylvania, have invented certain Improvements in Metal-Bench Structures, of which the following is a specification.

My invention relates to metal benches, or metal bench legs or supports for work benches; and the object of my invention is to provide an improved structure in which the legs may be made of sheet or structural metal pressed or otherwise formed into shape; said legs being combined with suitable bracket members and connecting elements whereby a rigid self-sustaining frame is made, much lighter than the cast structures heretofore employed, and readily assembled from parts pressed or otherwise formed into suitable shape. With the pressed-up parts, I may employ some usual structural shapes, and some cast parts.

These and other features of my invention are more fully described hereinafter, reference being had to the accompanying drawings, in which:

Figure 1, is a front elevation of one form of metal bench supporting structure made in accordance with my invention;

Fig. 2, is an end elevation of the same;

Fig. 10, is a sectional view on the line X—X, Fig. 2;

Figs. 11, 12 and 13, are sectional views illustrating modified forms of supporting legs within the scope of my invention;

Fig. 14, is a sectional view on the line XIV—XIV, Fig. 2;

Figure 3:
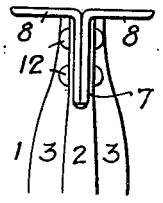
Figs. 3 and 4, are enlarged views of portions of the structure shown in Figs. 1 and 2.
Figure 4:
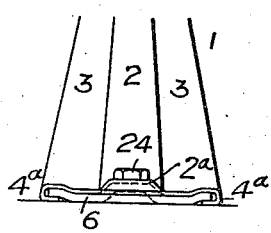

In the drawings, 1, 1, represent legs of the bench support which may be made of pressed-up sheet metal, and may be of a cross section substantially like that shown in Fig. 10; comprising a longitudinal rib 2 and side flanges 3; which flanges may have their sides or edges 4 turned over or rolled for reinforcement. The lower ends of these legs may be flared outwardly, as illustrated in Fig. 2, and at the same time the rib 2 may be reduced in the formation of the foot 5. Said foot may be additionally reinforced by the insertion of a plate 6 in the bottom of the same, which plate may be held in place by the rolled edges 4$^a$ of the foot, which are substantially continuous with those of the leg, or otherwise secured. If desired, the foot portion and said plate 6 may be further strengthened by a central rib formation 2$^a$, in line with the rib 2 of the leg.

The upper ends of the legs are split as at 7, for the reception of depending flanges of angle members 8, forming horizontal supporting means for the table 9 of the bench, and spacing and connecting said legs. The side flanges of the upper ends of the legs may be flattened at this portion to lie against said angle members. At the rear of the bench, brackets 10 are provided, against which the back 11 of the bench table may rest. The upper ends of the legs may be riveted, bolted or welded to the angle members 8 as at 12, and the brackets 10 may be riveted or otherwise secured thereto as at 13.

Various forms and arrangements of the connection of the form of legs shown in Figs. 1 and 2, with the angle members 8, may be employed, some of which I have illustrated in Figs. 5, 6, 7 and 8.

Figure 5:
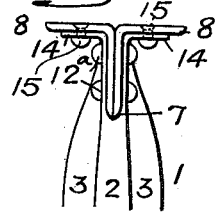
Figs. 5, 6, 7, 8 and 9, are views illustrating modified details of portions of the structure illustrated in Figs. 1, 2, 3 and 4, within the scope of my invention.

In the connection for the upper end of the bench leg shown in Fig. 5, the side walls of the leg 1, in addition to being riveted at 12$^a$ or otherwise secured to the angle members 8, may be turned over at 14 so as to underlie the horizontal flanges of the same, and they may be secured thereto by welding, or by rivets or bolts 15.

Figure 6:
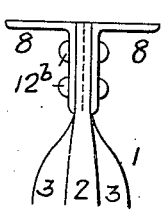

In the connection shown in Fig. 6, the upper end of the leg 1, instead of being split to receive the depending flanges of the angle members 8, may be compressed and disposed between said angle members; being secured thereto by rivets 12$^b$.

Figure 7:
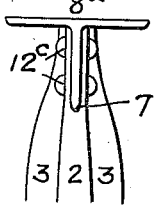

In the connection shown in Fig. 7, the upper end of the leg may be split in substantially the same manner as illustrated in Figs. 1 and 3, but instead of employing a pair of angle members such as shown at 8, a single angle member 8ª, T-shape in cross-section, may be employed; the same being secured to the leg by rivets 12ᶜ.

Figure 8:
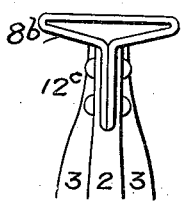

In the connection shown in Fig. 8, I have illustrated a modified form of table support in the shape of a pressed metal section 8ᵇ, which is provided with depending flanges fitting the split upper end of the leg, and secured to the same by rivets 12ᵈ.

Figure 9:
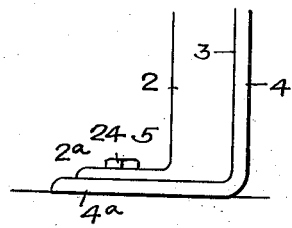

While I have shown in Figs. 1 and 2, a special form of leg and foot, with the leg, as illustrated in Fig. 2, spread and flared outwardly adjacent the foot, it will be understood that this portion of the leg may extend substantially to the foot in a vertical direction, as illustrated in Fig. 9. The feet are preferably apertured at 23 for the passage of a vertically disposed securing bolt 24.

It will be understood that while the form of leg illustrated with respect to the bench structure shown in Figs. 1 and 2, and having the cross-section shown in Fig. 10, is a preferable construction, I do not wish to be limited to the same, and legs having other cross-sections may be employed.

In the form shown in Fig. 11, the central rib 2 is employed, with side flanges 3; which flanges, however, omit the rolled edges 4. In Fig. 12, I have shown a form of leg of substantially the same shape as that illustrated in Fig. 10, with an additional plate 16 covering the recess of the longitudinal rib 2, and held in place by the rolled edges 4 of the flanges 3 of said leg. In this structure, as in that shown in Fig. 10, the rolled edges are inwardly disposed. In Fig. 13, however, I have shown a leg in cross-section having the central rib 2, and the side flanges 3, with outturned edges 4ᵇ for said flanges, substantially at right angles thereto.

By preference, the lower portions of the legs are spaced apart and braced by cross-pieces 17, which may be U-shape in cross-section, as illustrated in Fig. 14; having flanged ends 18 engaging the flanges 3 of the legs. The edges of the flanged ends 18 may underlie the rolled edges 4 of the bench legs, and said meeting flanges may be secured together by rivets 19. The cross-braces preferably carry a board 9ª to form a shelf for the bench, which is preferably provided with a back 11ª; such parts being suitably secured to the legs and cross-braces in any suitable or approved manner. Additional cross-braces may be provided, if desired and, if employed, they may form supports for other shelves with which the bench structure may be equipped.

Figure 15:
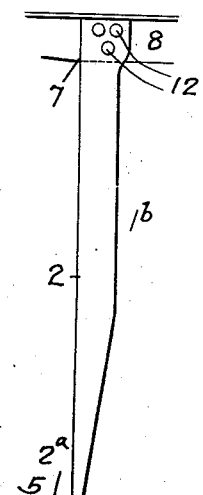
Figs. 15 and 16, illustrate, respectively, front and side elevations of a further modified form of bench leg or support within the scope of my invention.
Figure 16:
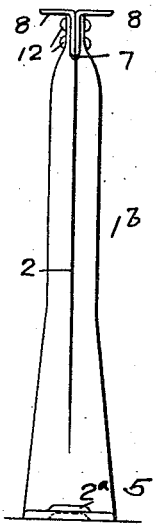
Figure 17:
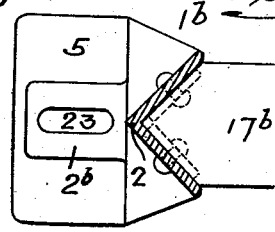
Fig. 17, is a plan view, partly in section, showing a brace for the leg or support illustrated in Figs. 15 and 16, and Fig. 18, is a sectional view illustrating a modified cross-section of leg of the type shown in Figs. 15 and 16.
Figure 18:
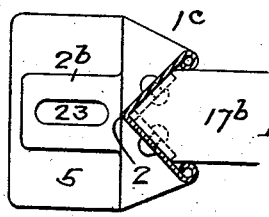

It will be understood, of course, that other forms of legs may be provided, and in Figs. 15 and 16, I have shown legs 1ᵇ made of structural or angular metal, V-shape in cross-section, in which the upper end is compressed and slit or split to receive the depending flanges of the angle members 8, while the lower end is flared and flanged to form a foot, which is preferably struck up in the center at 2ᵇ to stiffen the same. A cross section of this form of leg is shown in Fig. 17, which also illustrates a cross-brace for legs of this type; while a modified type of leg is shown in cross-section in Fig. 18, with a cross-brace for the same.

The leg and foot formation illustrated in Figs. 1 and 2, with the flared portion between the legs and feet, is of some advantage since the feet will have a bottom surface of a width greater than the width of the leg.

The greater part of my improved bench structure is readily constructed of sheet metal, bent to shape, and easy of assemblage, and the other parts are ordinary structural shapes and simple castings. In lieu of rivets for connecting the parts together to provide the desired leg or support for the bench table, these parts may be bolted or welded together, and I am thus able to provide a structure that may be shipped in a knocked down condition ready for assemblage at any point.

While I have shown my improved metal leg structures as forming the support for a single, short, bench, it will be understood that they may be employed at regular intervals for the support of benches of any desired length, and for any work, as for instance machinists' benches; sewing machine supports, and in fact for any purpose where a light, stiff, permanent or removable support is desired.

It will be noted that in the structure shown in Figs. 1 and 2 and the modifications thereof, each bench leg is substantially a single piece, since the reinforcing foot plate is not necessarily essential, and that a complete bench support consists of but six pieces, to wit: two legs; a bottom cross-brace; two angle members, and a bracket. In some instances as I have described and illustrated, I may use T-iron members at the upper ends of the legs instead of the angle members; thereby reducing the number of parts.

It will be understood, of course, that various modifications in the several connections will naturally suggest themselves to any one skilled in the art, hence I do not wish to be limited to the particular constructions illustrated in the drawings and described herewith.

I claim:

1. A bench leg of metal pressed into shape and provided with an integral hollow rib of considerable depth extending longitudinally of said leg, with laterally disposed flanges flanking said rib, the upper end of said ribbed leg being reduced in width, while the lower end of said leg is bent substantially at right angles to its vertical portion to form a foot, and reinforcing means for said foot.

2. A bench leg of sheet metal pressed into shape and provided with an integral hollow rib of considerable depth extending longitudinally thereof; said leg having laterally disposed flanges with rolled edges flanking said rib; the upper end of said leg with the rib being reduced in width, while the lower end of said leg is outwardly flared and bent substantially at right angles to its vertical portion to form a foot, and reinforcing means at the angle between said leg and foot.

3. A bench leg of sheet metal pressed into shape and provided with an integral hollow rib of considerable depth extending longitudinally of said leg from end to end of the same, flanges having rolled edges flanking said rib, and a foot substantially at right angles to said leg and reinforced by a rib formation integral with said leg, and supplemental reinforcing means for said foot at its junction with the leg.

4. A bench leg of sheet metal bent into form and having a hollow rib of considerable depth extending longitudinally of said leg, laterally disposed flanges with rolled edges flanking said rib; said flanges narrowing at the top and widening at the bottom and said leg being flared at the lower end and the rib thereof reduced adjacent said flaring portion, and a foot substantially at right angles to said leg; said foot being reinforced by a rib formation continuous with the rib of said leg.

5. A bench leg of sheet metal bent into form, with a hollow rib of considerable depth extending longitudinally of said leg, laterally disposed flanges with rolled edges flanking said rib; said leg being flared at the lower end and the rib thereof reduced adjacent said flaring portion, a foot substantially at right angles to said leg and reinforced by a rib formation continuous with the rib of said leg, and a reinforcing plate secured to said leg and foot at the junction thereof and held in place by said rolled edges.

6. A bench leg of metal bent into form with a rib extending longitudinally of said leg, flanges at each side of said rib, said flanges being reinforced by turning or rolling the edges of the same and said leg being flared at the lower end and the rib thereof reduced, and provided with a foot substantially at right angles to said leg and reinforced by a rib formation continuous with the rib of the leg, and a reinforcing plate secured to said foot and retained by the turned edges of the flanges thereof.

7. A bench leg of sheet metal bent into form, comprising a continuous section of pressed metal having a centrally disposed rib of considerable depth, with side flanges flanking the same and extending longitudinally of the leg, a foot integral with said leg, an outwardly flared portion between the leg and foot; the upper end of said leg being split in line with its rib and the walls adjacent the said split portion flattened into exact parallelism, and combined connecting and bracing members fitting within and secured to the split portion of said leg.

8. A bench leg comprising a continuous section of pressed metal having a centrally disposed rib of considerable depth, with side flanges flanking the same and extending longitudinally of the leg, an outwardly flaring foot widening toward the bottom integral with said leg; the upper end of said leg narrowing and being split in line with its rib and the walls adjacent the said split portion flattened into exact parallelism, combined connecting and bracing members fitting the split portion of said leg, and means for securing said bracing members to the leg.

9. A metal bench support comprising a plurality of legs each composed of a single continuous section of pressed metal having a centrally disposed hollow rib of considerable depth with integral side flanges flanking said rib; said flanges having rolled edges reinforcing the same, right-angled feet integral with said legs, outwardly flared portions gradually widening toward the bottom between each leg and its foot; the upper ends of said legs being split in line with their hollow ribs and the walls adjacent said split portions flattened into parallelism, combined connecting and bracing members fitting the split portions of pairs of said legs, cross braces connecting and spacing the lower ends of said legs adjacent the flaring portion of the same, and means for securing the several bracing members to the legs.

10. A bench support comprising a plurality of legs made of sheet metal and bent into form; each leg having a deep hollow reinforcing rib continuous therewith with side flanges flanking said ribs, feet integral with said legs and disposed substantially at right angles thereto and reinforced by a rib formation continuous with the rib of the leg, connecting and spacing cross braces between said legs at top and bottom of the same; the upper ends of said legs being split to receive the upper cross braces and the lower braces being disposed adjacent the flaring portions of the legs, and means for securing said braces to the respective portions of the legs.

11. A bench support comprising a plurality of legs, each made of pressed sheet metal and having longitudinal reinforcing ribs continuous with said legs and side flanges, with feet integral with said legs and disposed substantially at right angles thereto, said flanges having rolled edges, each leg having a flaring portion adjoining its foot, and crossbraces between said legs at the bottom of the same; said braces being disposed adjacent the flaring portion of the legs and having outwardly turned flanges at the ends underlying the rolled edges of said legs and confined to the flanges of the latter by rivets.

12. A bench support comprising a plurality of legs, each made of pressed sheet metal and having longitudinal reinforcing ribs continuous with said legs and side flanges, with feet integral with said legs and disposed substantially at right angles thereto, said flanges having rolled edges, each leg having a flaring portion adjoining its foot, cross-braces between said legs at top and bottom of the same; the upper ends of said legs being split to receive the upper cross-braces and the lower braces being disposed adjacent the flaring portion of the legs and having outwardly turned flanges at the ends underlying the rolled edges of said legs, and rivets securing the several cross-braces to the legs.

HOWARD T. HALLOWELL.